United States Patent [19]

Newman

[11] 4,381,564
[45] Apr. 26, 1983

[54] WAVEGUIDE LASER HAVING A CAPACITIVELY COUPLED DISCHARGE

[75] Inventor: Leon A. Newman, South Windsor, Conn.

[73] Assignee: United Technologies Corporation, Hartford, Conn.

[21] Appl. No.: 286,225

[22] Filed: Jul. 23, 1981

Related U.S. Application Data

[63] Continuation of Ser. No. 52,887, Jun. 28, 1979, abandoned.

[51] Int. Cl.³ .............................................. H01S 3/08
[52] U.S. Cl. ...................................... 372/87; 372/64; 372/82
[58] Field of Search ................. 331/94.5 PE, 94.5 G, 331/94.5 C; 372/82

[56] References Cited

U.S. PATENT DOCUMENTS

| | | | |
|---|---|---|---|
| 3,614,653 | 10/1971 | Javan et al. | 331/94.5 G |
| 3,928,816 | 12/1975 | Hartwick et al. | 331/94.5 G |
| 3,961,283 | 6/1976 | Abrams et al. | 331/94.5 C |
| 4,039,971 | 8/1977 | Wang et al. | 331/94.5 PE |

*Primary Examiner*—William L. Sikes
*Assistant Examiner*—Leon Scott, Jr.
*Attorney, Agent, or Firm*—Lawrence A. Cavanaugh

[57] ABSTRACT

A waveguide laser having a gain medium excited by a capacitively coupled self-sustained discharge is disclosed. The gain medium is disposed within a dielectric waveguide having a capillary bore centrally located therein. A gain medium such as a rare gas halide mixture is excited by a capacitively coupled discharge between a power electrode circumferentially and axially enveloping a central portion of the waveguide and ground electrodes disposed proximate the ends of the waveguide between the mirrors defining the optical cavity of the laser. A preferred embodiment of the laser further includes means for circulating the gain medium through the waveguide. The present invention is adapted for providing pulses of radiation having a wavelength in the ultraviolet and visible spectrum and pulse widths typically less than 30 nanoseconds with peak powers in excess of one kilowatt.

7 Claims, 3 Drawing Figures

WAVEGUIDE LASER HAVING A CAPACITIVELY COUPLED DISCHARGE

This is a continuation of application Ser. No. 052,887 filed on June 28, 1979 now abandoned.

BACKGROUND OF THE INVENTION

The present invention relates to gas lasers and more particularly to a waveguide laser having a gain medium excited by a capacitively coupled discharge.

Laser systems having a gain medium including halide and rare gas elements and utilizing direct electrical discharge excitation are capable of providing output beams having radiation with wavelengths in the ultraviolet and/or visible spectrum. Wang et al. in U.S. Pat. No. 4,039,971 filed May 4, 1976 discloses a fast discharge, high power, electric discharge pumped gas laser. The laser includes a Blumlein-type discharge device employing a pair of coplanar conductor plates with linear spaced apart confronting edges constituting the anode and cathode electrodes of the discharge device with the lasing gas occupying the volume of the gas between the electrodes. Additionally, Burnham et al., in "Applied Physics Letters", Volume 29, No. 1, July 1, 1976 discloses an electric discharge laser having a xenon fluoride or krypton fluoride gain medium. The laser action was obtained in the xenon fluoride and krypton fluoride in a transverse electric discharge powered by a fast Blumlein-type circuit. The laser employed parallel plate electrodes and the lasing gas was excited by capacitive discharge between the electrodes.

In prior art devices the maximum power output and/or pulse repetition rates are limited by the temperature rise in the gain medium during operation. High power and/or high pulse rate operation requires that the gain medium efficiently transfer heat, generated by the discharge, out of the gain medium. Typically, this is accomplished by providing a coolant to extract heat from the gain medium, by circulating the gain medium through a heat exchanger or by flowing the gain medium through the optical cavity in a single pass system.

The utilization of a waveguide optical cavity such as disclosed by Schlossberg in United States Patent 4,103,255 allows the laser to be operated with a small diameter discharge thereby reducing the size of the laser and the power required to sustain lasing action. Additionally, a waveguide laser enables operation with a gain medium at high pressure.

SUMMARY OF THE INVENTION

A primary object of the present invention is to provide laser radiation having a wavelength in the ultraviolet and visible spectrum between 0.2 and 0.7 microns.

A further object of the present invention is to provide pulses of laser radiation having pulse widths less than 30 nanoseconds with peak powers in excess of one kilowatt.

In accordance with the present invention there is provided a waveguide laser having a gain medium excited by a capacitively coupled self-sustained discharge. The gain medium is disposed within a dielectric waveguide having a capillary bore centrally disposed therein passing from a first end to a second end. The waveguide is disposed within an optical cavity defined at one end by a first mirror positioned proximate the first end of the waveguide and at the other end by a second mirror positioned proximate the second end of the waveguide. A high voltage electrode, having a cylindrical configuration, circumferentially and axially envelops a central portion of an external surface of the waveguide intermediate the first and second ends. Ground electrodes are disposed within end cavities defined by the first mirror and the first end of the waveguide and by the second mirror and the second end of the waveguide respectively. The first and second mirrors and the first and second ends of the waveguide respectively are disposed within housings adapted for providing a gas tight connection therebetween. The housings include gas ports for passing gas into and out of the optical cavity and electrical means for connection to the ground electrodes.

The present invention is a laser having a unique combination of a waveguide optical cavity, a rare gas halide gain medium and a capacitively coupled gas discharge mechanism.

A primary feature of the present invention is the high voltage electrode symmetrically disposed about the waveguide adapted for capacitively coupling pulses of electrical energy into the gain medium. Additionally, the first and second mirrors are disposed in a close spaced-apart relationship with the first and second ends of the waveguide to minimize end losses within the cavity. Also, in the preferred embodiment, the gain medium includes at least one of the rare gases and at least one of the halide gases. Additionally, the waveguide is formed of a dielectric material having a capillary bore centrally disposed therein.

A primary advantage of the present invention is the small cross-sectional area of the active gain medium disposed within the capillary bore of the waveguide allowing a small time constant for thermal conduction of heat within the gain medium to the walls of the waveguide. The small time constant for thermal conduction enables the laser to be repetitively pulsed at pulse repetition rates of at least 100 hertz with the full width half maximum pulse widths of less than 10 nanoseconds. Additionally, the small bore diameter allows high pressure operation of the laser having xenon fluoride and krypton fluoride gain mediums and enables the gain medium to be exposed to the large pump power densities required for operation of rare gas halide lasers with modest input energy. Also the discharge mechanism between the high power electrode and the ground electrodes provides a diffuse uniform discharge through the entire volume of the capillary bore within the waveguide without arcing problems. With the rare gas halide gain medium the waveguide laser produces an output beam having wavelengths in the ultraviolet and visible spectrum.

The foregoing and other objects, features and advantages of the present invention will become more apparent in the light of the following detailed description of preferred embodiments thereof as discussed and illustrated in the accompanying drawing.

DESCRIPTION OF THE PREFERRED EMBODIMENT

Figure 1:
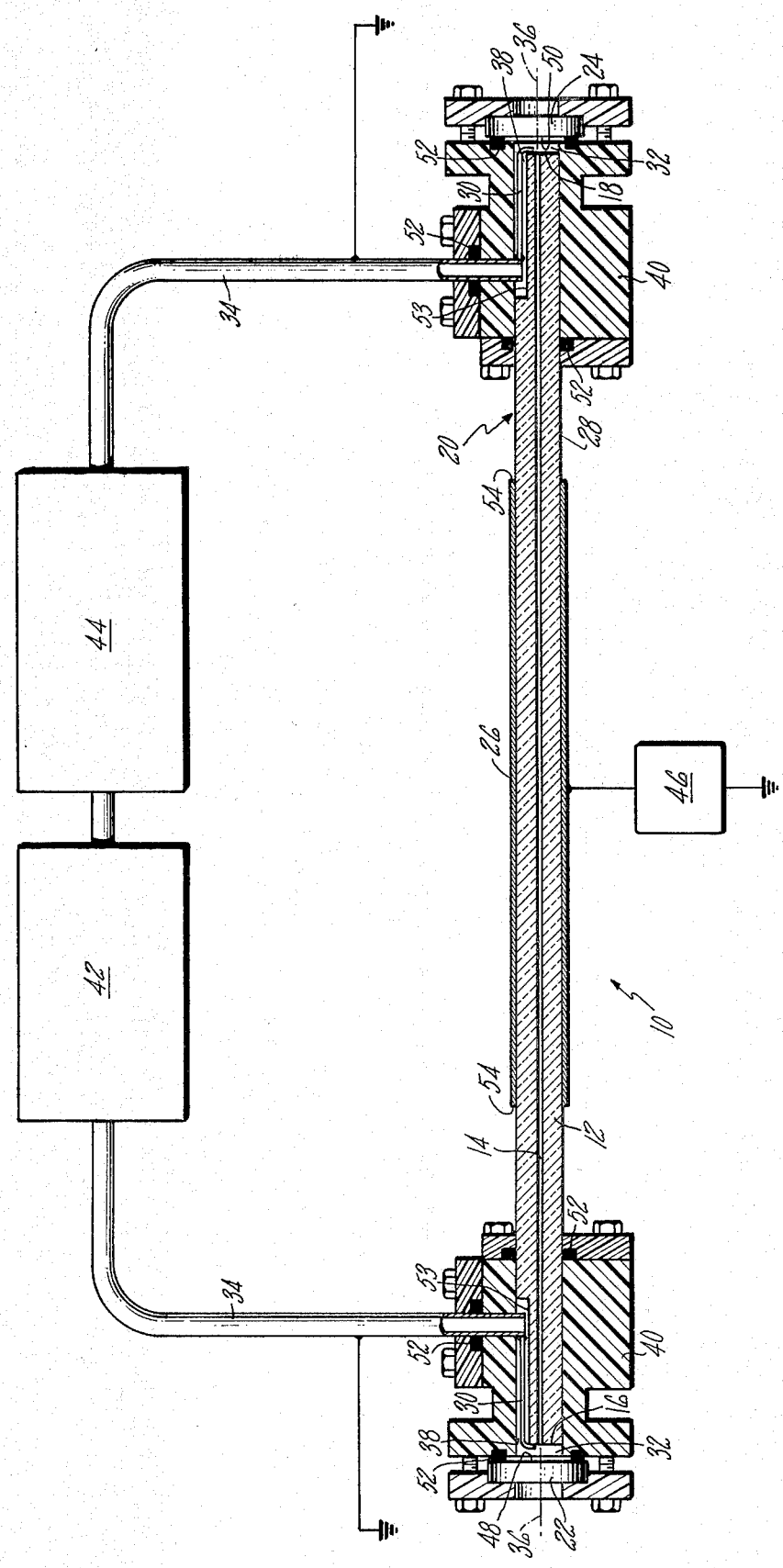
FIG. 1 is a simplified schematic of the principal elements of the present invention.

Referring now to FIG. 1, a waveguide laser 10 adapted for having a gain medium excited by capacitively coupled self-sustained discharge is shown. The laser includes a waveguide 12 in the form of a rod of dielectric material such as quartz, beryllium oxide or the like having a precision capillary bore 14 centrally disposed therein and passing therethrough from a first end 16 to a second end 18. The waveguide is disposed within a cavity 20 defined at one end by a first mirror 22 disposed proximate the first end 16 of the waveguide in a spaced-apart relationship therewith and at the other end by a second mirror 24 disposed proximate the second end 18 of the waveguide in a spaced-apart relationship thereto. A high voltage electrode 26, in the form of a metal foil, circumferentially and axially envelops a central portion of an exterior surface 28 of the waveguide and is capacitively coupled to ground electrodes 30 through a gain medium disposed within the capillary bore. The ground electrodes 30, preferably fabricated of nickel wire, are disposed within end cavities 32 defined by the first mirror and the first end of the waveguide and the second mirror and the second end of the waveguide respectively. The ground electrodes are connected at one end to a return pipe 34 which is electrically grounded and terminating at the other end in the end cavities 32 in a vertical spaced-apart relationship from a center line axis 36 passing through the capillary bore 14 such that the ground electrodes do not inhibit the passage of radiation between the first and second mirrors. A gas feed channel 38 disposed within housings 40 enclosing the first and second ends of the waveguide connects the end cavities 32 with the return pipes 34. The housings 40 are adapted for adjustably securing the first and second mirrors therein and for providing a gas tight seal about the first and second ends of the waveguide for maintaining a gaseous medium therein by means well known in the art. A gas reservoir 42 and a circulator 44 are connected to the return pipes 34 and are adapted for enabling the gain medium within the capillary bore to be replenished and/or recirculated. In the preferred embodiment the return pipes 34, the gas reservoir and the circulator are all fabricated of stainless steel material. The high voltage electrode 26 is connected to a high voltage supply 46 adapted for providing high voltage pulses by means well known in the art.

In a preferred embodiment, the first mirror 22 has a flat reflective surface 48 with a totally reflective dielectric coating thereon. The second mirror 24 has a flat reflective surface 50 and is preferably fabricated or sapphire to form an output mirror. A low diffraction-loss waveguide optical cavity 20 is formed between the first and second mirrors by placing the mirrors within a few millimeters of the first and second ends of the waveguide. In this configuration, the free space to waveguide coupling loss is less than one percent for the lowest order waveguide mode. It is to be recognized that mirrors having curved reflective surfaces can also be utilized in the present invention by positioning the mirrors along the center line axis at a distance approximately equal to the radius of curvature away from the first and second ends of the waveguide.

The mirrors, housings and ground electrodes are all fabricated with material compatible with rare gas halide gas mixtures.

In the preferred embodiment the waveguide is fabricated with a quartz tube and the housing 40 is fabricated of teflon and includes viton "O" rings 52 to provide a gas tight seal between the housing and the waveguide, the mirrors and the housing, and between the return pipes 34 and the housing. A portion 53 of the exterior surface 28 of the waveguide disposed within the housing has a reduced diameter to accommodate the gas feed channel 38 therein.

In operation a gaseous gain medium such as rare gas halides including xenon fluoride, krypton fluoride and xenon chloride is maintained within the capillary bore of the waveguide at operating pressures variable from a few hundred torr to atmospheric pressure. A high voltage pulse, such as a 30 kilovolt pulse with a 20 nanosecond rise and fall time and a Gaussian-shaped time response, from the high voltage supply 46 is applied to the high voltage electrode. When the pulse is first applied to the high voltage electrode, the gain medium is initially in a non-conducting state. However, an electric field rapidly develops between the ends 54 of the high voltage electrode and the ground electrodes 30 resulting in an electrical breakdown of the gaseous medium therebetween. The initial coupling capacitance at the initiation of the breakdown is just that between the ground electrodes and the extremities of the high voltage electrode. The gaseous conductor subsequently formed between the ends of the high voltage electrode and the ground electrode allows the ground potential to extend within the capillary tube within the high voltage electrode. This increases the effective coupling capacitance due to a change in the conductor geometry and breaks down and excites the gas in the interior of the high voltage electrode. Thus the coupling capacitance is time dependent; its final value is given by the final conductor geometry just after the discharge which is in the form of a coaxial capacitor. For the configuration wherein the dielectric waveguide consists of a 20 centimeter pyrex precision bore capillary tube with a 0.5 millimeter bore diameter and a 6.2 millimeter outer diameter, the capacitance is calculated to be 10 picofarads.

Figure 2:
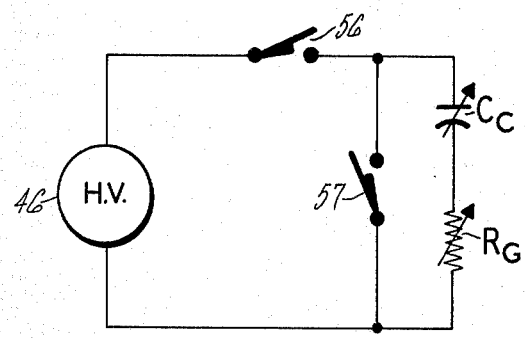
FIG. 2 is an equivalent diagram of the capacitive coupling mechanism of the present invention.

FIG. 2 shows a simplified schematic of an equivalent discharge circuit for the capacitively coupled laser. The high voltage source 46 is connected through the gain medium $R_G$ by a switch 56 and a capacitance $C_c$ between the high voltage electrode and the gaseous gain medium within the capillary bore as shown in FIG. 1. In this capacitive coupling mechanism, when switch 56 is closed, essentially one-half of the electrical energy derived from the source is stored in the capacitor and one-half is dumped into the gain medium. The source is then removed from the load by opening switch 56 and switch 57 is closed, thereby discharging the energy stored in $C_c$ into the gas. Thus, essentially all of the energy derived from the high voltage source is passed to the gaseous gain medium. The capacitively coupled discharge mechanism of the present invention does not require preionization means are required by prior art devices. It is to be recognized that the gain medium may be preionized before the initiation of the high voltage pulse by means (not shown) well known in the art.

The small active volume of the gain medium within the waveguide allows the achievement of large pump power densities necessary for rare gas halide lasers with a very modest energy input. This is necessary for the rare gas halide lasers because the threshold pump powers for these lasers are in the order of 10 to 100 kilowatts per cubic centimeter regime. In addition, the small bore diameter of the waveguide allows a small time constant for thermal conduction of the heat generated within the discharge to the walls of the tube. Efficient heat transfer from the gain medium is required to obtain high pulse repetition rates and to minimize the thermal density gradients within the gain medium to obtain high optical quality therein. Additionally, efficient heat transfer is required to minimize the temperature rise of the gain medium, which may adversely effect the kinetic chain of events necessary to produce the gain medium.

Since the walls of the capillary bore are in close proximity to the gain medium, the thermal conduction time constants are of the order of one hundred microseconds which enables the gain medium to cool between pulses thereby restoring the optical quality of the gain medium between pulses. For a gas mixture containing mostly helium in a 0.5 millimeter bore tube the thermal conduction time constant is typically tens of microseconds for gas pressures from a few hundred torr to atmospheric pressure. Because cooling of the gas between pulses can be achieved in this configuration, high pulse repetition rate operation of this device is not precluded due to excessive gas heating adversely affecting the kinetics of the rare gas halide gain medium or of the destruction of the optical quality of the active medium caused by gas heating induced density gradients. The present invention is capable of operating at pulse repetition rates up to 10 kilohertz without gas heating effects preventing the operation thereof. Greater heat transfer characteristics can be obtained by slowly recirculating the gain medium with the cirrculator 44 through a heat exchanger (not shown) by means well known in the art.

Figure 3:
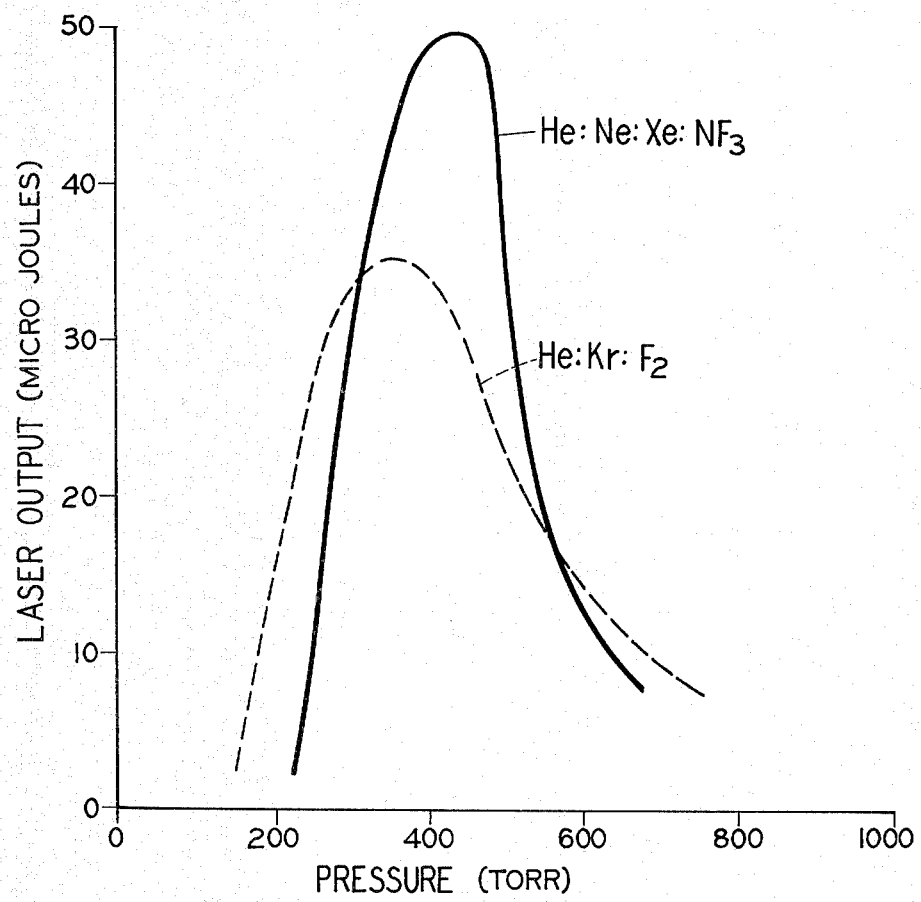
FIG. 3 is a graph of the energy output of a laser as a function of total pressure and gas constituents.

In the operation of a waveguide laser consisting of a twenty centimeter pyrex precision bore capillary tube with a 0.5 millimeter bore diameter and a 6.2 millimeter outer diameter, output energies of 35 microjoules at 351 nanometers for a xenon fluoride gain medium and 50 microjoules at 248 nanometers for a krypton fluoride gain medium have been obtained. The full width half-maximum duration of the xenon fluoride laser pulse was 10 nanoseconds while for the krypton fluoride laser a full width half-maximum pulse of 3 nanoseconds was obtained as shown in FIG. 3. For these conditions the discharge energy deposited into the gas was 3 to 4 microjoules thus yielding an intrinsic efficiency of approximately one percent for both systems. The xenon fluoride gain medium resulted from a static fill of helium, neon, xenon and nitrogen trifluoride in the ratio of 48.5:48.5:2:1, while the krypton fluoride gain medium resulted from a static fill of helium, krypton and fluorine in the ratio of 89:10:1. A static fill of helium; xenon and hydrogen chloride in a pressure ratio of 91:8:1 produced laser radiation on a xenon chloride transistion at 308 nanometers with the sustained operation at a repetition rate of 100 hertz.

Typical gas compositions are: 90–95% helium and/or neon; 1–9% xenon, krypton, argon; and 0.1–1% halide donar molecules.

While this invention has been described in the preferred embodiment it would be apparent for those skilled in the art that various modifications may be made to the apparatus without departing from the scope of the invention as hereinafter claimed.

Having thus described typical embodiments of my invention that which I claim as new and desire to secure by Letters Patent of the United States is:

1. An optical apparatus comprising:
    an optical resonant cavity bounded by first and second mirrors, said mirrors disposed along an axis extending through said cavity;
    a dielectric waveguide having an outside surface and a capillary bore disposed along said axis within said cavity for guiding radiation within said capillary bore;
    a gaseous optical gain medium disposed within said waveguide;
    energizing means for creating a population inversion by capacitive coupling within said gain medium, whereby optical radiation is resonated between said mirrors and guided by said waveguide;
    wherein the improvement comprises that said energizing means for creating a population inversion includes an electrode structure comprising a first electrode disposed outside said waveguide and a second electrode having an active end disposed within said gaseous gain medium and further improved in that said energizing means includes means for applying a voltage pulse between said first and second electrodes, whereby said population inversion is created in said gain medium by coupling energy from said electrodes to said gain medium.

2. An apparatus according to claim 1, in which said first electrode extends along a first portion of said axis and said active end of said second electrode extends along a second portion of said axis, said first and second portions of said axis being separated by a first predetermined distance.

3. An apparatus according to claim 2, in which said active end of said second electrode is separated from said waveguide by a second predetermined distance along said axis.

4. An apparatus according to claim 3, in which first and second enclosures support said first and second mirrors proximate first and second ends of said waveguide, one of said first and second enclosures also enclosing said active end of said second electrode, and in which apparatus said gaseous optical gain medium extends throughout said waveguide and said first and second enclosures.

5. An apparatus according to claim 2, in which said first electrode substantially encloses circumferentially that portion of said waveguide extending along said first portion of said axis.

6. An apparatus according to claim 1, in which said gaseous gain medium includes a rare gas and a halide.

7. An apparatus according to claim 6, in which said rare gas comprises between one and nine percent of the total and said halide comprises between one tenth of one percent and one percent of the total.

* * * * *